Figure 1:
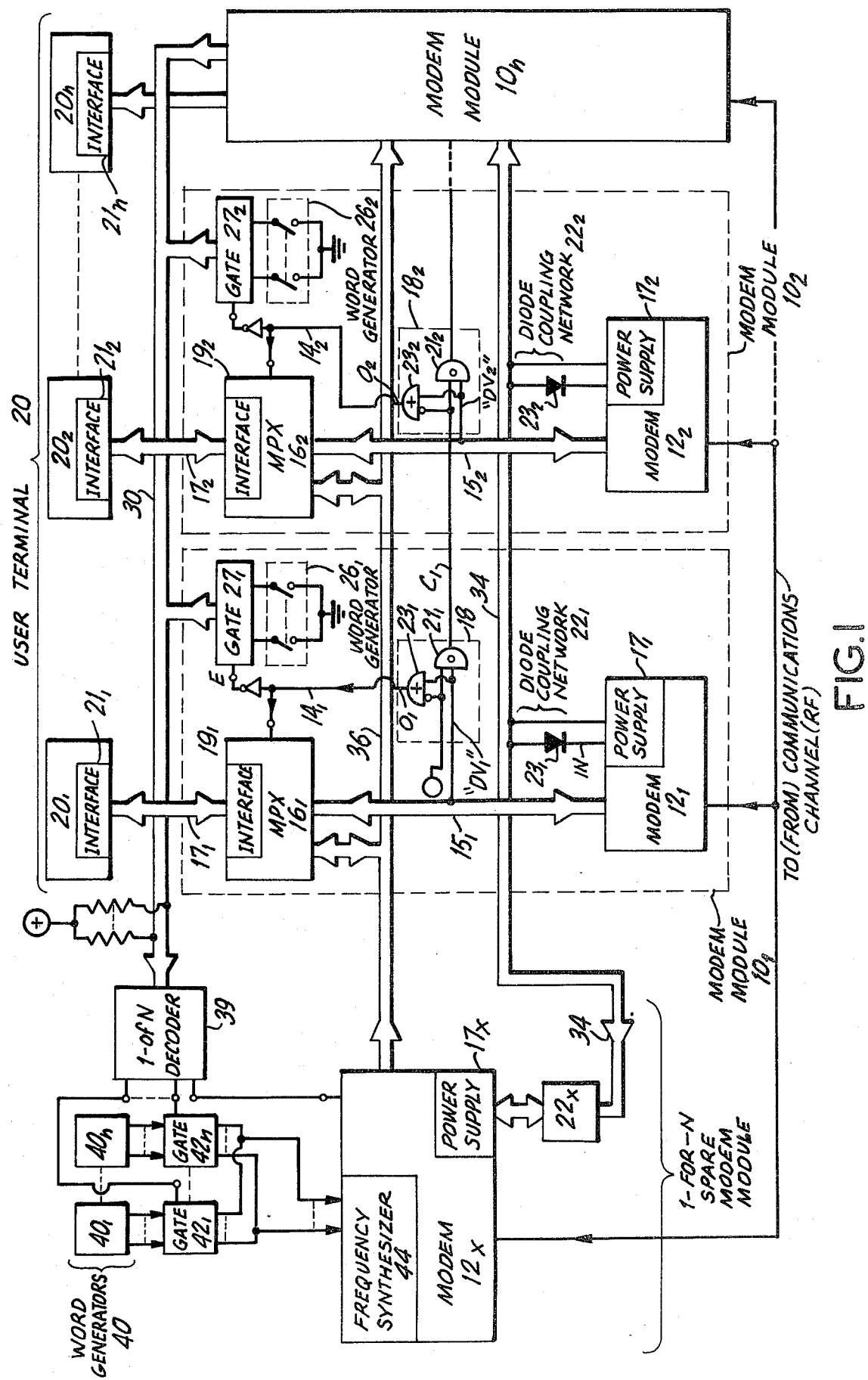

United States Patent [19]

Entenman

[11] 4,245,342
[45] Jan. 13, 1981

[54] ONE-FOR-N MODEM CONTROL APPARATUS

[75] Inventor: Alan W. Entenman, Hicksville, N.Y.

[73] Assignee: Intech Laboratories, Inc., Bohemia, N.Y.

[21] Appl. No.: 2,332

[22] Filed: Jan. 10, 1979

[51] Int. Cl.³ .................. G06F 11/00; H04B 17/00
[52] U.S. Cl. .................. 371/8; 340/147 SC; 370/16
[58] Field of Search .............. 340/146.1 BE, 147 SC; 235/303.3; 325/2, 40, 47, 56; 370/13, 16; 371/8

[56] References Cited

U.S. PATENT DOCUMENTS

| | | |
|---|---|---|
| 2,680,162 | 6/1954 | Brehm et al. .................. 340/147 SC |
| 3,111,624 | 11/1963 | Farkas .......................... 340/147 SC |
| 3,518,549 | 6/1970 | Sarati ........................... 340/147 SC |
| 3,681,694 | 8/1972 | Sarati ............................ 325/2 |
| 3,886,318 | 5/1975 | Charransol et al. ........ 340/146.1 BE |
| 3,963,988 | 6/1976 | Niethammer ................... 325/56 |
| 4,039,947 | 8/1977 | Miedema ...................... 340/147 SC |
| 4,119,815 | 10/1978 | Frankfort et al. ............ 340/147 SC |

*Primary Examiner*—Charles E. Atkinson
*Attorney, Agent, or Firm*—Hopgood, Calimafde, Kalil, Blaustein & Lieberman

[57] ABSTRACT

Communications apparatus includes one-for-n modem redundancy for a plurality of typically contiguously disposed modem modules. The modem modules comprise n active units each illustratively operating in a different frequency band and a redundant (spare) modem of electronically adjustable frequency. The on-line (active) modem modules each include a multiplexer which normally connects user terminal equipment associated with the module to the frequency translating and data and control signal processing circuitry in the module.

When a fault is detected in one of the modems (sensed, for example, by negated module "data valid" or "clear to send" levels for receive and transmit modems, respectively), a hierarchal control network and related apparatus automatically sets the redundant modem to the proper operating frequency and substitutes the spare for the failed unit via the appropriate multiplexer.

In an alternative, microprocessor controlled embodiment of the present invention, the dedicated priority of the hierarchal control network may be replaced by any desired algorithm for alloting the redundant modem among the n on-line unit.

3 Claims, 2 Drawing Figures

ONE-FOR-N MODEM CONTROL APPARATUS

DISCLOSURE OF INVENTION

This invention relates to electronic communications and, more specifically, to improved plural modem communications apparatus having one-for-n modem redundancy and/or automated substitution apparatus.

It is an object of the present invention to provide improved modem control apparatus.

More specifically, it is an object of the present invention to provide improved modem control apparatus which automatically operatively substitutes a redundant spare modem for any failed one of n active units, establishing the required heterodyning frequency for the activated spare modem.

It is further objects of the present invention to provide one-for-n redundant modem and modem controlling apparatus which is readily, economically and reliably constructed; modularized and expandable; and which is space efficient.

It is another object of the present invention to obviate relatively long signalling paths between modem modules and dedicated spare modem switching apparatus spaced therefrom; thus also substantially reducing the requirement for standard signal transforming interface couplings (e.g., Bell 303, MIL 188, RS 232, 449, V35 or the like) at each end of the cabling between the modem modules and the switching apparatus.

Still another object of the present invention is to provide, in one implementation, program controlled modem apparatus.

The above and other objects of the present invention are realized in a specific, illustrative communications apparatus including one-for-n modem redundancy for a plurality of typically contiguously disposed modem modules. The modem modules comprise n active units each illustratively operating in a different frequency band and a redundant (spare) modem of electronically adjustable frequency. The on-line (active) modem modules each include a multiplexer which normally connects user terminal equipment associated with the module to the frequency translating and data and control signal processing circuitry in the module.

When a fault is detected in one of the modems (sensed, for example, by negated module "data valid" or "clear to send" levels for receive and transmit modems, respectively), a hierarchal control network and related apparatus automatically sets the redundant modem to the proper operating frequency of the replaced unit and substitutes the spare for the failed unit via the appropriate multiplexer.

In a microprocessor controlled implementation of the present invention, the dedicated priority of the hierarchal control network may be replaced by any desired algorithm for alloting the redundant modem for possibly plural failed ones of the active modem plurality.

Figure 2:
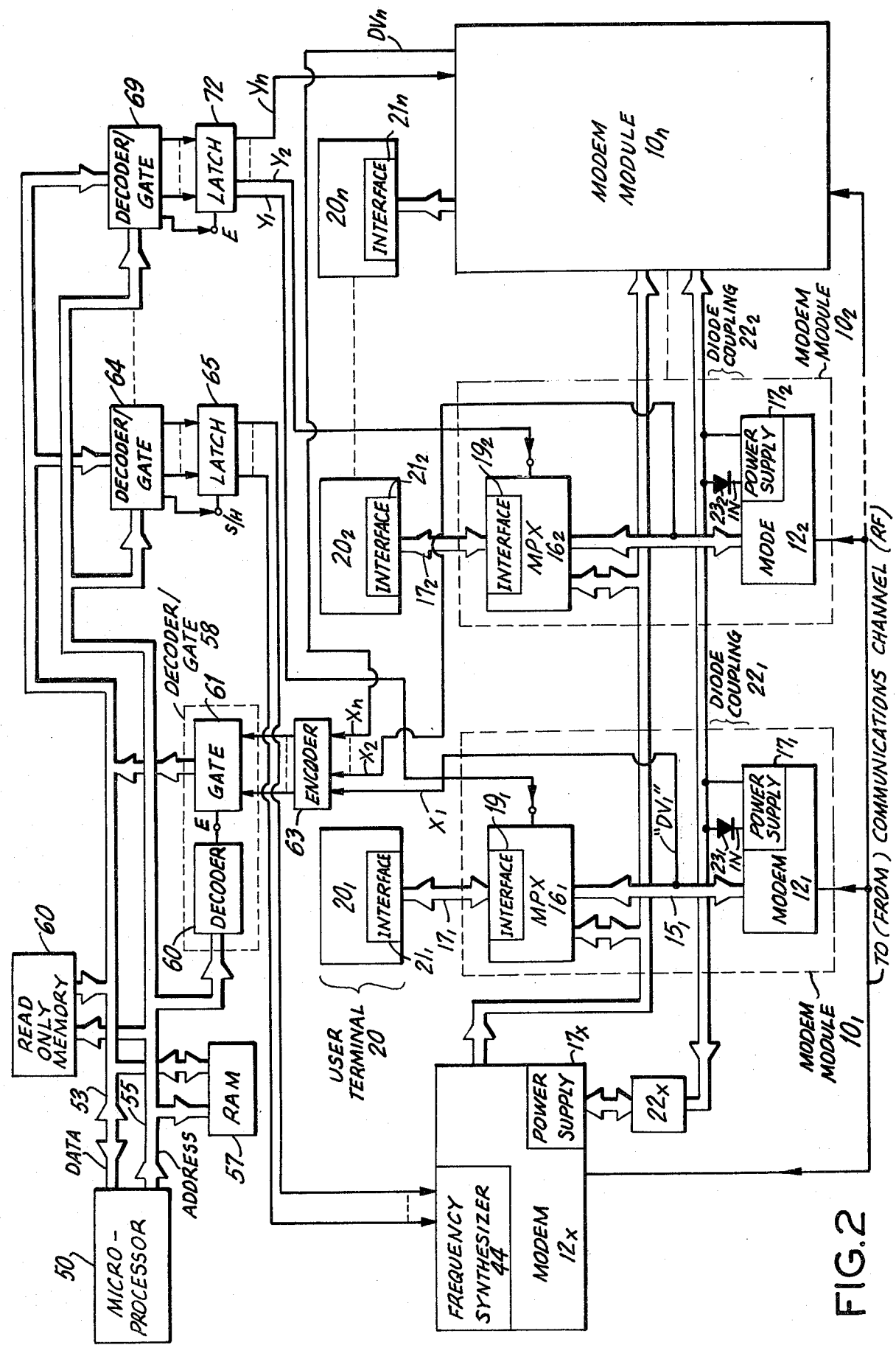

The above and other features and advantages of the present invention will become more clear from the following detailed description of two illustrative embodiments thereof, presented hereinbelow in conjunction with the accompanying drawing, in which:

FIG. 1 is a schematic diagram illustrating a first embodiment of the present invention; and FIG. 2 schematically illustrates a second illustrative communications arrangement incorporating the present invention.

Referring now to FIG. 1, there is schematically shown communications apparatus having a plurality of n modem modules $10_1$-$10_n$, and a further single redundant modem module 11. In overall scope, each of the modules $10_i$ serves to interconnect an associated subscriber electronic terminal $20_i$ with a typically common communications channel, the actual modem portion $12_i$ of the modem module $10_i$ performing the classic frequency shifting (heterodyning) function as any ancillary data processing, data format conversion, control signal generation and/or the like.

As is well known, modems are basically of three types: receive only; transmit only; or full duplex providing both the receive and frequency functions for full bilateral communications. A receive only modem extracts (i.e., receives) one limited frequency band portion of a wider band common communications channel by heterodyning only the desired band (by application of a unique local oscillator frequency) to the fixed pass band of a intermediate frequency amplifier. Thus, a particular modem will extract from an ensemble of messages disposed at mutually different frequencies on a communications channel only that message or frequency portion intended for the terminal equipment connected to the output of the modem.

Analogously, transmit only modems supply a unique carrier frequency to frequency shift (up-convert) a user terminal supplied message (most simply, at base band) to desired limited frequency spectrum. Where plural transmit only modems are utilized, the different output bands of the modems are then linearly combined to form a composite wide band message for transmission by a common communications channel.

A full duplex type of modem substantially comprises a receive only and transmit only portions, each of which operate in the above described manner.

In accordance with the principle of the present invention, the plural modem modules $10_1, \ldots, 10_n$ are all of a like type, for example and not limitation, receive only. Thus also, the spare modem module 11 is of the like receive only type. It is the purpose of the spare modem module 11 to automatically replace any failed one of the n modules $10_i$. Where different types of modem modules are employed, one redundant module is employed for each plural element group of each modem module type.

Turning to the specific communications architecture of FIG. 1, consider now the specific structure for the modem module $10_1$, which typifies the structure in the other modules $10_2$-$10_n$ (other than for operative frequency)—and to a large measure also, that of the redundant module 11. The illustrative modem module $10_1$ includes a per se will known modem portion $12_1$ including a power supply section $17_1$. For the assumed receive only construction, a typical modem $12_1$ includes a down-converting hetrodyne circuit for converting the appropriate frequency portion of the signal on a common communications link, supplied via conductor $13_1$, to the fixed pass band of an intermediate frequency amplifier. The illustrative modem $12_1$ has further frequency converting hetrodyne apparatus for down-converting from intermediate frequency to base band; and for effecting any requisite conditioning and signal generation for the recovered information. Again, the modem apparatus $12_1$ is per se well known to those skilled in the art and will not be further considered.

The output information at the output of modem $12_1$ is supplied via a plural conductor bus $15_1$ to one input of a multiplexer $16_1$ contained within the modem module $10_1$. The signals impressed on the plural bus $15_1$ are all governed as to format, polarity, conductor signal placement and the like by standards such as those given above.

There is included in such signal ensemble present on bus $15_1$, a data line conveying the recovered information, as well as various control lines including a conductor signalling the operative/failed status of modem $12_1$. This latter conductor is shown at the right for the bus $15_1$ in the drawing and, for the assumed received only modem, is typically referred to as the "data valid" signal. For a transmit only modem, the comparable signal indicating correct equipment operation has been deemed the "clear to send" signal.

The output of the multiplexer $16_1$ is coupled by a bus $17_1$ to the user terminal equipment $20_1$ connected to the modem module $10_1$ and adapted to receive the information recovered by the modem $12_1$. Such terminal may be of any kind well known to those skilled in the art, e.g., teletype, computer, communications network or any other digital or analog peripheral. Because the bus $17_1$ may be of some length, cooperating interface equipment $19_1$ and $21_1$ are respectively included at the output section of the multiplexer $16_1$ and the input of the user terminal $20_1$ to enhance substantially error free coupling of the requisite signals via the bus $17_1$. The interface equipment, again, is per se well known to those skilled in the art, such couplings being given by standards such as Bell 303, V35, and the like additional of which have been previously set forth above.

Connected as a second input to the multiplexer $16_1$ (and to the corresponding multiplexer $16_i$ in each of the other modem modules $10_2-10_n$) is the output of the redundant modem $12_x$ in the spare modem module 11 via a back panel bus 36.

As an overall statement of operation, the multiplexer $16_1$ (and those of the other modules $10_i$ as well) normally connects the signals on the bus $15_1$ driven by the modem $12_1$ to the bus $17_1$ for delivery to the user terminal $20_1$. This condition obtains as long as the modem module $10_1$ is operating in good order. This selection is effected by a multiplexer $16_1$ control signal ($0_1$) applied from the output of a hierarchal control network comprising a cascaded chain of logic circuits 18 via a control lead $14_1$. In particular, as long as the modem $12_1$ is working properly (active or "1" state "data valid" signal) the output signal $0_1$ on lead $14_1$ from circuit $18_1$ is a "1" causing the multiplexer $16_1$ to connect the buses $15_1$ and $17_1$.

More generally, the Boolean expression for the multiplexer control signal $0_i$ for a logic circuit $18_i$ is given by $0_i = C_{i-1} + DV_i$, when $C_{i-1}$ is the cascade output of the previous circuit $18_{i-1}$ and $DV_i$ is the "data valid" signal for the module $10_i$. The cascade output $C_i = C_{i-1} \cdot DV_i$. One illustrative implementation for the logic circuits 18 is shown in FIG. 1 and comprises the gates $21_i$ and $23_i$.

However, should the modem $12_1$ fail, a resulting low level inactive "data valid" $DV_1$ signal is applied to the lower of logic circuit $18_1$. The resulting "0" level output signal $0_1$ coupled to the multiplexer $16_1$ control port causes the multiplexer $16_1$ to connect the output of the redundant modem module 11, modem $12_x$ via the bus 36 to the outgoing bus $17_1$ and thus to the user terminal $20_1$. To reiterate, the user terminal $20_1$ is connected via bus $17_1$ to the bus $15_1$ and modem $12_1$ so long as the modem $12_1$ is operative as signalled by the "data valid" control line; or to the spare modem module 11 via bus 36 should the modem $12_1$ fail.

The cascaded logic circuits $18_i$ establish a hierarchy for the modem modules 10. If only one of the modem $12_i$ in the modem module ensemble $10_i$ fail, the redundant modem module 11 is automatically substituted for the failed unit in the manner above described. However, if more than one of the modems 12 fail, the cascaded circuits 18 establish a hierarchy or priority such that the spare modem will be substituted only for the left-most module shown in the drawing. This result obtains since the first binary "0" established at the $C_i$ output of one of the circuits $18_i$ blocks the "0" variable in all circuits 18 to the right thereof from switching to the "0" state (via the inhibited input to gate $23_j$).

The above discussion has demonstrated how the redundant modem 11 is substituted for the active modem portion $12_i$ in any failed unit $10_i$ via a substitution of bus 36 for bus $15_i$ via multiplexer $16_i$ in the down module $10_1$. However, it will be appreciated that a frequency snythesizer 44 in the spare modem module 11 must be set to the proper (and typically unique) frequency of the failed module which is being replaced such that the correct down-converting hetrodyne frequency is established in the spare module 11. The frequency synthesizer 44, of course, serves as the local oscillator for the receive only modem (and as the carrier oscillator for a transmit only unit). Variable frequency synthesizers 44 are well known to those skilled in the art. In one common version, frequency is adjusted by varying the division factor in a phase locked loop with the control digital word.

To this end, the $0_1$ signal on conductor $13_1$ (again treating the unit $10_1$ as typical of the other modules) which controls the multiplexer $16_1$ to operatively connect the bus 36 while disconnecting the bus $15_1$ upon failure of the modem $12_1$ also enables a gate $27_1$ (after inversion). This passes signals from a register or word generator $26_1$ to a bus 37 for communication to the redundant modem 11.

The word generator $26_1$ is set to a predetermined binary code identifying the particular module $10_1$ and may comprise any electronic latch or register, including a set of open/closed switches. Gate $27_1$ may be of the well known tri-state type such that when not energized, the gate effectively becomes isolated from the bus 37.

Again assuming that the module $10_1$ modem $12_1$ has failed, the identifying word from generator $26_1$ passes through gate $27_1$ to the bus 37 (shown as having pull-up resistors for current sinking logic) and passes to a one-of-N decoder 39. The decoder 39 activates one and only one of its output leads depending upon the input code supplied thereto, the bottom-most output terminal disabling the spare modem 11 responsive to an all "1's" input code on bus 37 signalling the usual case that all modules $10_1-10_n$ are operating correctly.

When one of the modules fails, the module $10_1$ for the assumed case, the decoder 39 enables a corresponding gate $42_i$ ($42_1$ for the failed module $10_1$) thereby passing a digital word stored in an associated word generator $40_1$ to the frequency control port of the frequency synthesizer 44 in the redundant modem $12_x$. The contents of the word generators $40_1$ is precisely that digital pattern required to set the frequency synthesizer 44 to the frequency of the fixed frequency local oscillator in the replaced modem $12_1$. Thus, not only is the redundant modem module 11 substituted for the modem $12_1$ via the bus 36 and multiplexer $16_1$; but it is set to the correct operating frequency to emulate the desired performance of the modem $12_1$. Should modem $12_1$ fail, then, the redundant modem module 11 is automatically substituted therefor and service continues, uninterrupted, for the user terminal $20_1$.

Obviously what is said above with respect to module $10_1$ applies as well for the other modules $10_2$–$10_n$, subject to the constraint that only the most significant (leftmost in the drawing) module will be operatively replaced should there be multiple failures.

An additional back panel bus 34 interconnects each of the active and redundant modules $10_i$ and 11 via a diode network $22_i$. The bus 34 has plural conductors, one for each of the supply voltages generated by the power supply $17_1$ in the modules and required therefor. Only one reprsentative diode $23_i$ is shown, this being for positive voltage. The bus 34 and diode networks $22_i$ are employed to maintain each of the modem modules $10_i$ operative if the only failure therein occurs to a power supply. The particular manner, connection and use of the voltage on the bus 34 is per se well known to those skilled in the art. In brief, the diode ensemble $23_i$ for any potential effectively act in an OR logic manner to maintain the corresponding voltage (less one diode drop potential) on the associated conductor in the bus 34, and isolates a failed power supply. The direct wire return may be used directly as the voltage source for each module for the subject potential.

Referring now to FIG. 2, there is shown a second, microprocessor 50 controlled implementation of the FIG. 1 communications system with the attendant one-for-N redundant modem 11. Like reference designations in FIGS. 1 and 2 identify like elements.

In overview, the FIG. 2 arrangement operates very similarly vis-a-vis the FIG. 1 arrangement regarding operation of the several system modem modules $10_1$–$10_n$ and the redundant module 11. The principal difference is the use of a microprocessor 50 which effects the functions of the control logic circuit hierarchy 18 and of the word generators 26 and 40 and gates 17 and 42 for controlling the frequency of the frequency synthesizer 44 in the redundant module 11. In brief, the "data valid" $DV_i$ signals $x_1, \ldots, x_n$ from the modems $10_1 \ldots 10_n$ are treated as computational input variables. Correspondingly, the 0's signals $Y_1, \ldots, Y_n$ which control the multiplexers $16_1 \ldots 16_n$, as well as the binary frequency controlling word applied to the frequency synthesizer 44 are treated as software controlled output variables.

To this end, data and address buses 52 and 55 are connected to microprocessor 50, and have read only memory (ROM) and read and write (RAM) memory units 60 and 57 connected thereto, this combination of elements operating in a per se conventional common bus digital computing mode.

As a part of the cyclic operation of microprocessor 50 control for the overall communications system of FIG. 2, the address bus 55 periodically opens gate $61_1$ enabled by an address decoder 60 in a per se classic decoder/gate combination 58. At such times, the state of all modules $10_1$ reported by the "data valid" signals $x_1$–$x_n$ are encoded at element 63 and connected through to the microprocessor 50 by the now enabled gate 61 and the data bus 52. Accordingly, the microprocessor 50 is thus informed by the operationally failed state of the several system modem modules 10.

The microprocessor 50 loads a multiplexer 16 controlling latch 72 with the multiplexer $16_i$ controlling signals $Y_1$–$Y_n$ acting through the decoder/gate 69. All of the signals $Y_i$ are normally enabled, e.g., at "1" levels, when all modules $10_i$ are performing properly to thereby connect each user terminals $20_i$ to the associative operative modem $12_i$ via multiplexer $16_i$ and buses $17_i$ and $15_i$. However, when the input variables x entered via encoder 63 and gate 61 signal that one of the modems $12_i$ has failed, the corresponding $y_i$ variable stored in latch 72 by microprocessor 50 is changed to the alternate "0" state. The user terminal $20_i$ is thereby connected to multiplexer $16_i$ to the redundant modem $12_x$ in spare modem module 11.

To set the frequency of the frequency synthesizer 44 in the redundant module to the appropriate frequency, the digital word required for the synthesizer 44 is stored in a latch 65. This is effected by the microprocessor 50 presenting the requisite word on the data bus 52, while impressing on the address bus 55 an address which is decoded at decoder/gate 64 and which passes the information on data bus 52 to (and only to) the latch 65 which is enabled at such time. Thus, in a manner paralleling that described, the redundant modem $12_x$ is substituted for any failed modem $12_i$ while automatically being set to the appropriate frequency to heterodyne the desired portion of the common communications channel for reception and delivery to the user station $20_i$ (again, assuming without loss of generality a receive only modem $12_i$).

The communications system with the one-for-N modem redundancy of FIGS. 1 and 2 have each thus been shown to automatically set the frequency synthesizer 44 of the spare modem $12_x$ to the frequency of a failed modem; and to operatively connect the spare modem to replace a down unit without loss of service to the user terminal equipment connected to the failed modem. In the FIG. 1 arrangement, all connections were via dedicated equipment, a logic circuit 18 hierarchy being employed to allot the redundant modem among the modules 10 in case of multiple failure. In the arrangement of FIG. 2 microprocessor controlled apparatus is employed; and may allot the spare modem among the modules 10 in accordance with any desired priority algorithm (fixed or changing).

The above described arrangement is merely illustrative of the principles of the present invention. Numerous modifications and adaptations thereof will be readily apparent to those skilled in the art without departing from the spirit and scope of the present invention.

What is claimed is:

1. In combination, plural on-line modem modules each including heterodyning and signalling modem means and controlled multiplexing means for connecting a first port thereof with one of second and third ports, said second port being connected to said modem means, a redundant modem module having heterodyning and signalling modem means connected to said third ports of said multiplexers in said on-line modem modules, said heterdyning means in said redundant module being frequency adjustable in accordance with a frequency control signal, priority assignment control means connected to said modem means and said multiplexers of said on-line modem modules for normally controlling said multiplexers to connect said first and second ports and responsive to sensing a failure of said modem means for connecting said first and third ports of said multiplexer of a failed one of said modem means, said control means including priority assignment means for connecting said first and third ports of only one of said multiplexers in accordance with a predetermined modem hierarchy, and frequency implementing means responsive to said control means connecting said first and third ports of a failed modem means for supplying said frequency control signal to said heterodyne modem means in said redundant modem module to substantially duplicate the operational frequency of said failed modem means said priority assignment control means comprising plural cascaded logic circuit means, one of said logic circuit means being included in each of said modem modules.

2. In combination, plural on-line modem modules each including heterodyning and signalling modem means and controlled multiplexing means for connecting a first port thereof with one of second and third ports, said second port being connected to said modem means, a redundant modem module having heterodyning and signalling modem means connected to said third ports of said multiplexers in said on-line modem modules, said heterodyning means in said redundant module being frequency adjustable in accordance with a frequency control signal, priority assignment control means connected to said modem means and said multiplexers of said on-line modules for normally controlling said multiplexers to connect said first and second ports and responsive to sensing a failure of said modem means for connecting said first and third ports of said multiplexer of a failed one of said modem means, said control means including priority assignment means for connecting said first and third ports of only one of said multiplexers in accordance with a predetermined modem hierarchy, and frequency implementing means responsive to said control means connecting said first and third ports of a failed modem means for supplying said frequency control signal to said heterodyne modem means in said redundant modem module to substantially duplicate the operational frequency of said failed modem means said priority assignment control means comprising microprocessor means connected to said modem modules for receiving signals representing the operative status of said plural module modem means, memory means connected to said microprocessor for storing a modem module hierarchy, and means connecting said microprocessor means and said module multiplexing means for selectively connecting said first and third ports of a failed one of said modem modules in accordance with the modem module hierarchy stored in said memory means.

3. A combination as in claim 2 wherein said frequency implementing means comprises storage means included in said redundant modem module, said microprocessor storing said frequency control signal in said storage means for controlling the operative frequency of said heterodying means of redundant modem module.

* * * * *

UNITED STATES PATENT AND TRADEMARK OFFICE
CERTIFICATE OF CORRECTION

PATENT NO. : 4,245,342
DATED : January 13, 1981
INVENTOR(S) : Alan W. Entenman

It is certified that error appears in the above-identified patent and that said Letters Patent are hereby corrected as shown below:

IN THE CLAIMS:

Claim 2, Column 7, line 24 - after "on-line" add --modem--;

Claim 3, Column 8, line 27 -

"heterodying" should be --heterodyning--.

Signed and Sealed this

Twelfth Day of May 1981

[SEAL]

Attest:

RENE D. TEGTMEYER

Attesting Officer     Acting Commissioner of Patents and Trademarks